(12) United States Patent
Jiang et al.

(10) Patent No.: US 11,873,131 B2
(45) Date of Patent: Jan. 16, 2024

(54) VACUUM STORAGE TANK

(71) Applicant: Ningbo Lockedin Intelligent Technology Co., Ltd, Cixi (CN)

(72) Inventors: Qingshan Jiang, Cixi (CN); Yize Yu, Cixi (CN)

(73) Assignee: Ningbo Lockedin Intelligent Technology Co., Ltd, Cixi (CN)

( * ) Notice: Subject to any disclaimer, the term of this patent is extended or adjusted under 35 U.S.C. 154(b) by 209 days.

(21) Appl. No.: 17/580,674

(22) Filed: Jan. 21, 2022

(65) Prior Publication Data

US 2022/0144526 A1 May 12, 2022

(30) Foreign Application Priority Data

Mar. 11, 2021 (CN) .......................... 202120518011.4

(51) Int. Cl.
*B65D 81/20* (2006.01)
*F16K 17/00* (2006.01)

(52) U.S. Cl.
CPC ..... *B65D 81/2038* (2013.01); *B65D 81/2015* (2013.01); *F16K 17/00* (2013.01)

(58) Field of Classification Search
CPC ............ B65D 81/2038; B65D 81/2007; B65D 81/2015; F16K 17/00; F16K 17/04
See application file for complete search history.

(56) References Cited

U.S. PATENT DOCUMENTS

| 2,628,541 | A | * | 2/1953 | Gamble | ............... | A24D 3/0245 493/45 |
| 2003/0197011 | A1 | * | 10/2003 | Nieh | .................. | B65D 81/2015 220/203.23 |
| 2006/0138068 | A1 | * | 6/2006 | Tsai | ..................... | B65D 81/2015 215/230 |
| 2009/0014452 | A1 | | 1/2009 | Schuhbeck | | |
| 2018/0259128 | A1 | | 9/2018 | Bassetto et al. | | |
| 2019/0389360 | A1 | | 12/2019 | Kibler | | |

FOREIGN PATENT DOCUMENTS

| CN | 215400017 U | * | 1/2022 | ......... B65D 81/2038 |
| EP | 3298910 A1 | * | 3/2018 | |
| KR | 20110114159 A | * | 10/2011 | |
| KR | 20120012663 A | * | 10/2012 | |

* cited by examiner

Primary Examiner — Christopher R Harmon

(57) ABSTRACT

The disclosure provides a vacuum storage tank, comprising a vacuum storage tank body. The vacuum storage tank body is provided with a storage cavity and a pressure release channel in communication with the storage cavity. The pressure release channel is provided with a pressure release structure, the pressure release structure includes a pressure release cylinder, and the pressure release cylinder is placed in the pressure release channel. The pressure release cylinder includes a manipulation part and a sealing member for blocking a port of the pressure release channel, and the manipulation part extends from an outer wall of the vacuum storage tank body. A reset retaining structure is arranged between the pressure release cylinder and the vacuum storage tank body to control the pressure release cylinder so that the sealing member keeps blocking the port of the pressure release channel.

11 Claims, 7 Drawing Sheets

VACUUM STORAGE TANK

TECHNICAL FIELD

The present disclosure relates to the technical field of food storage apparatuses requiring vacuum storage, and in particular, to a vacuum storage tank.

BACKGROUND

At present, almost all fresh-keeping boxes available in the market only provide sealed fresh-keeping or vacuum fresh-keeping, and must be vacuumized with auxiliary air exhausting devices. If an air leakage occurs during the vacuum fresh-keeping and cannot be found in time, the fresh-keeping effect of the food will be affected to cause waste, and if spoiled food is eaten by mistake, it will even be unhealthful. Therefore, a vacuum storage tank is researched and developed. However, the structure of an air release valve in the vacuum storage tank is too simple, resulting in frequent air leakage during use, so that a desirable vacuum preservation function for stored items cannot be well achieved. In particular, food, such as rice, in long-term vacuum preservation is particularly prone to deterioration.

SUMMARY

An objective of the present disclosure is to solve the above technical deficiencies and design a vacuum storage tank having a compact and reliable structure to avoid the occurrence of air leakage in a vacuum storage cavity.

The vacuum storage tank designed by the present disclosure includes a vacuum storage tank body. The vacuum storage tank body is provided with a storage cavity and a pressure release channel in communication with the storage cavity, and the pressure release channel is provided with a pressure release structure. The pressure release structure includes a pressure release cylinder, and the pressure release cylinder is placed in the pressure release channel. The pressure release cylinder includes a manipulation part and a sealing member for blocking a port of the pressure release channel, and the manipulation part extends from an outer wall of the vacuum storage tank body. A reset retaining structure is arranged between the pressure release cylinder and the vacuum storage tank body to control the pressure release cylinder so that the sealing member keeps blocking the port of the pressure release channel.

Preferably, the vacuum storage tank body includes a tank and a cover detachably connected to an opening of the tank, the pressure release channel is arranged on the cover, and the reset retaining structure is arranged between the pressure release cylinder and the cover to control the pressure release cylinder so that the sealing member keeps blocking the port of the pressure release channel.

Preferably, a first ring body and a second ring body covering the first ring body are installed on the cover, the first ring body is provided with a plurality of numeric identifiers, and the second ring body is provided with a through hole corresponding to a position of at least one of the numeric identifiers.

Preferably, the cover includes an upper shell and a lower shell. The upper shell and the lower shell are joined together to form an accommodation cavity, the accommodation cavity is provided with a vacuum generator, the lower shell is provided with a vacuumizing channel, the vacuum generator is connected to the vacuumizing channel through a pipeline, and the manipulation part penetrates a perforation of the upper shell. A filter body is installed on the lower shell, and the filter body covers the vacuumizing channel and the pressure release channel.

Preferably, the lower shell is provided with a negative pressure observation channel, a flexible sleeve is sleeved at a port of the negative pressure observation channel, the flexible sleeve is provided with an observation column, and the observation column penetrates the upper shell.

Preferably, the reset retaining structure includes at least one of a first spring and a second spring;
two ends of the first spring respectively abut against a first step of the manipulation part and a second step of the upper shell;
or two ends of the second spring respectively abut against a third step of the pressure release cylinder and a fourth step beside the pressure release channel.

Preferably, the upper shell is provided with an installation groove at a position of the perforation, the first step of the manipulation part is placed in the installation groove, and the second step is arranged in the installation groove.

Preferably, an inner wall of the installation groove and the first step of the manipulation part are respectively provided with a sliding through groove and a limiting buckle, the limiting buckle correspondingly sinks into the sliding through groove, and an inner wall of the sliding through groove is provided with a limiting step for up-limiting upward movement of the manipulation part.

Preferably, the inner wall of the installation groove is further provided with a fifth step, and after the manipulation part moves downward, the first step and the fifth step abut against each other for position-limiting.

Preferably, an inner wall of the perforation of the upper shell is provided with a limiting through groove, an upper portion of the pressure release cylinder is provided with a vertical protrusion correspondingly matching the limiting through groove, and the vertical protrusion is correspondingly inserted into the limiting through groove.

Preferably, the sealing member includes a seal ring sleeved and fixed on the pressure release cylinder, a port of the pressure release channel is provided with a tapered channel, the tapered channel has an upper port smaller than a lower port, and an outer wall of the seal ring abuts against an inner wall of the tapered channel during blocking.

Preferably, the pressure release cylinder further includes a cylinder part located below the manipulation part, the cylinder part and the manipulation part are separated, an upper portion of the cylinder part is provided with the third step having a lower portion sleeved and fixed to the seal ring; a cylinder of the manipulation part penetrates the perforation of the upper shell and then abuts against an upper end of the cylinder part, and the vertical protrusion is arranged; the seal ring is sleeved and fixed on a lower portion of the cylinder part, and abuts against the second spring at least between the third step of the cylinder part and the fourth step beside the pressure release channel.

In the vacuum storage tank designed by the present disclosure, the pressure release structure is compact and reliable. After the sealing member blocks the port of the pressure release channel, the port of the pressure release channel is sealed and retained by the reset retaining structure to prevent the vacuum storage cavity of the tank from air leakage, thereby further enabling the vacuum storage tank to have a desirable long-term vacuum storage function.

DETAILED DESCRIPTION

Figure 1:
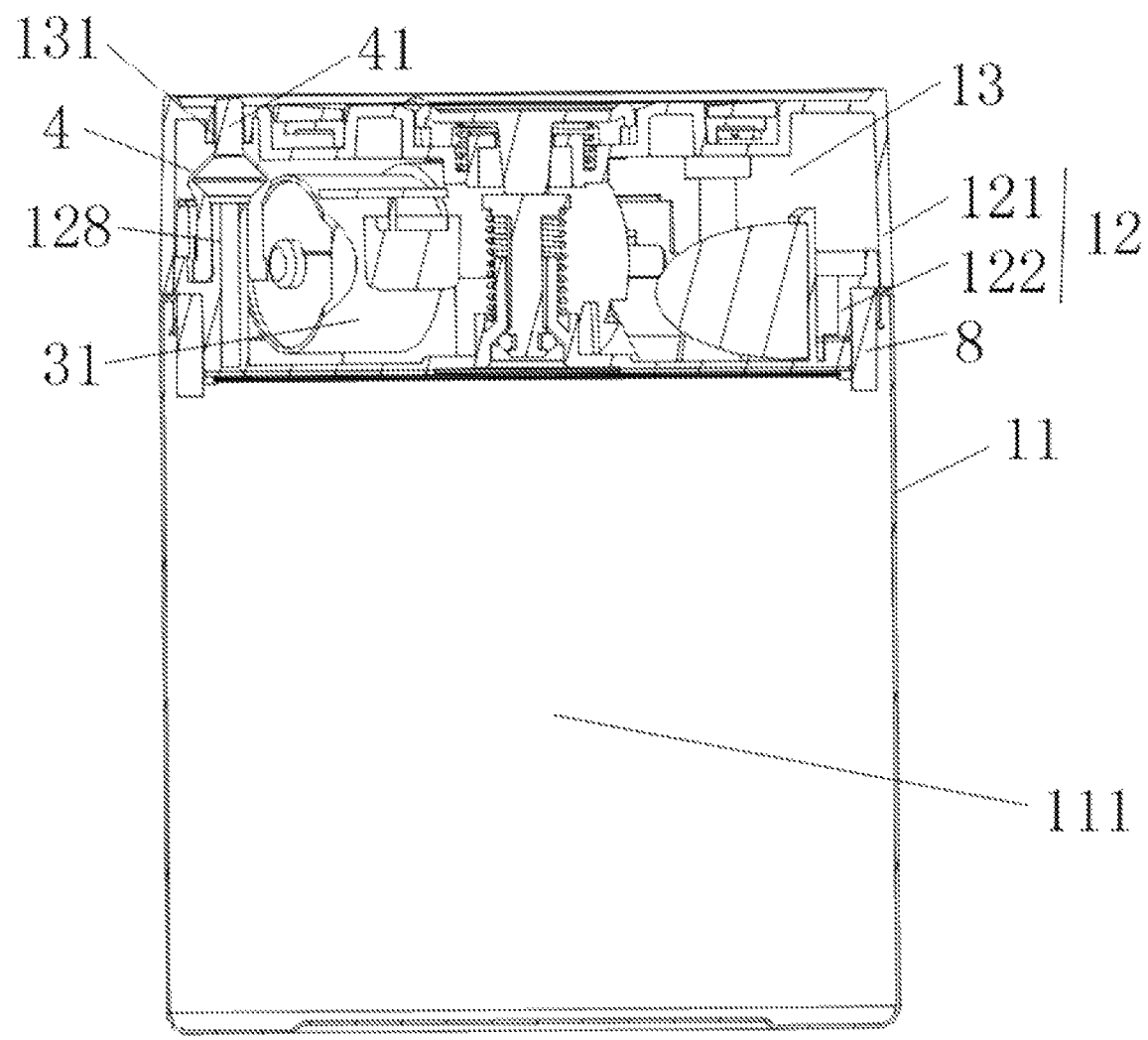
FIG. 1 is a schematic view (1) of an overall structure.
Figure 2:
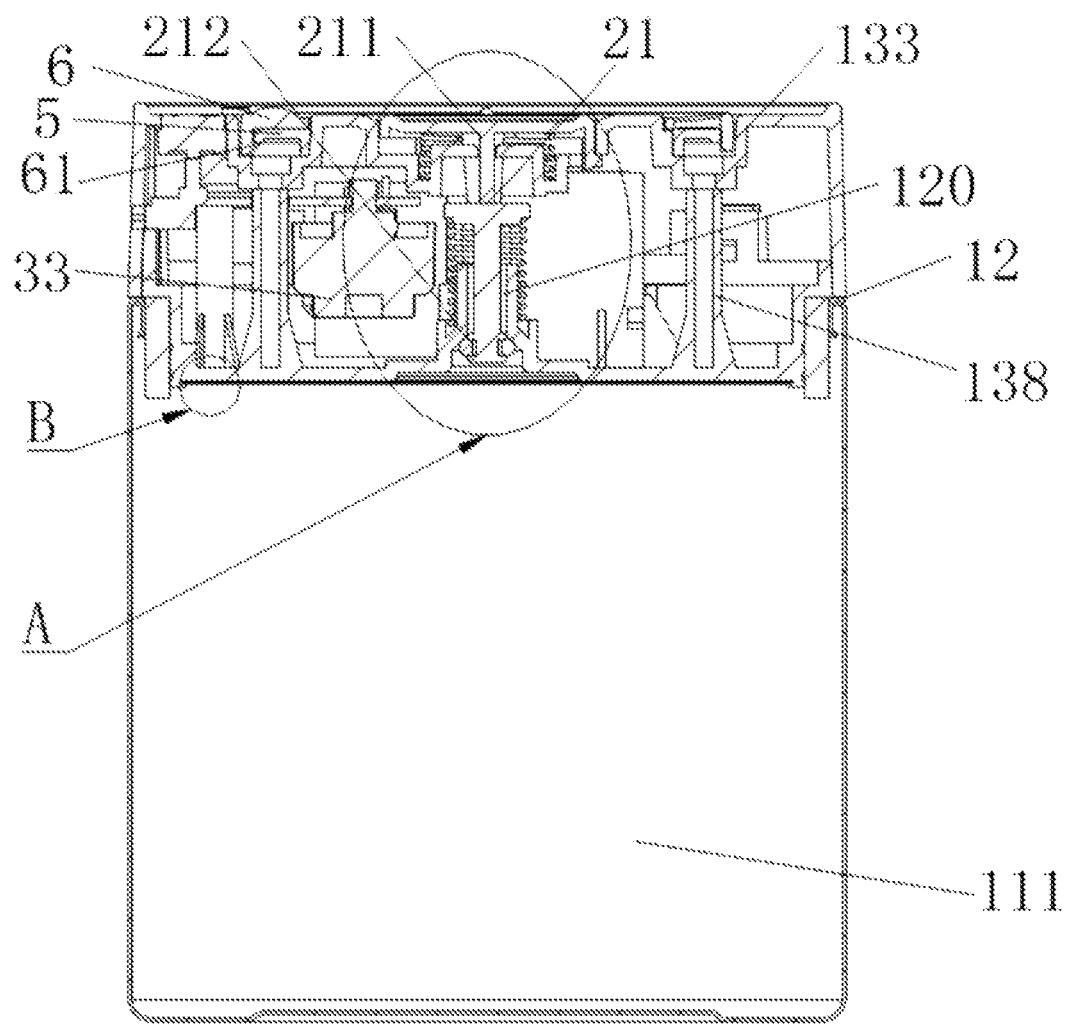
FIG. 2 is a schematic view (2) of an overall structure.
Figure 3:
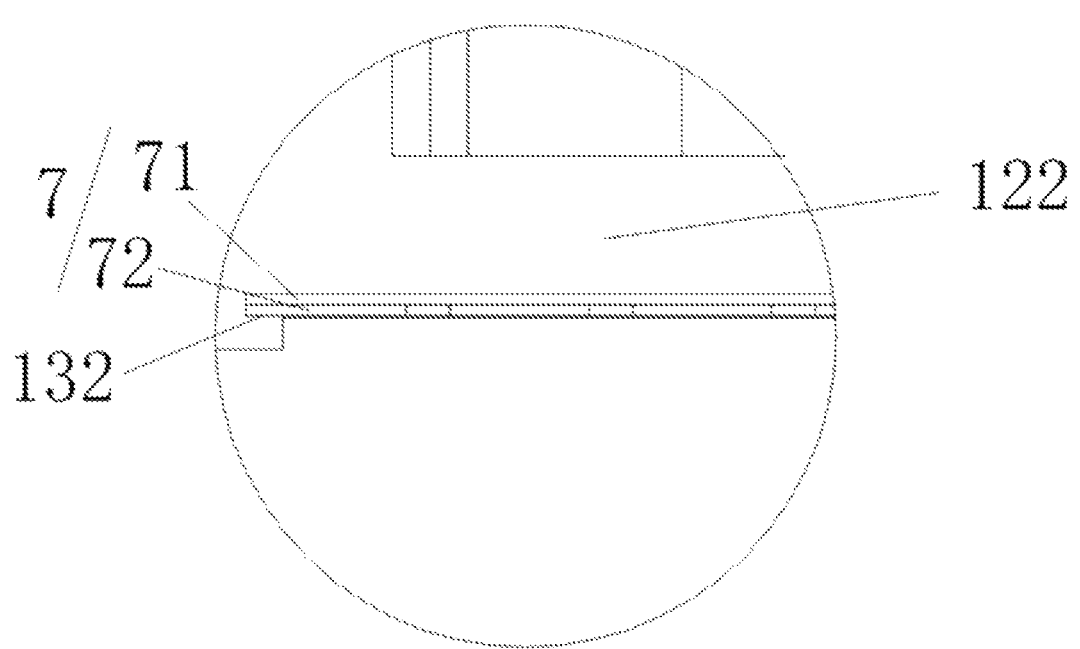
FIG. 3 is a partial enlarged view of B.
Figure 4:
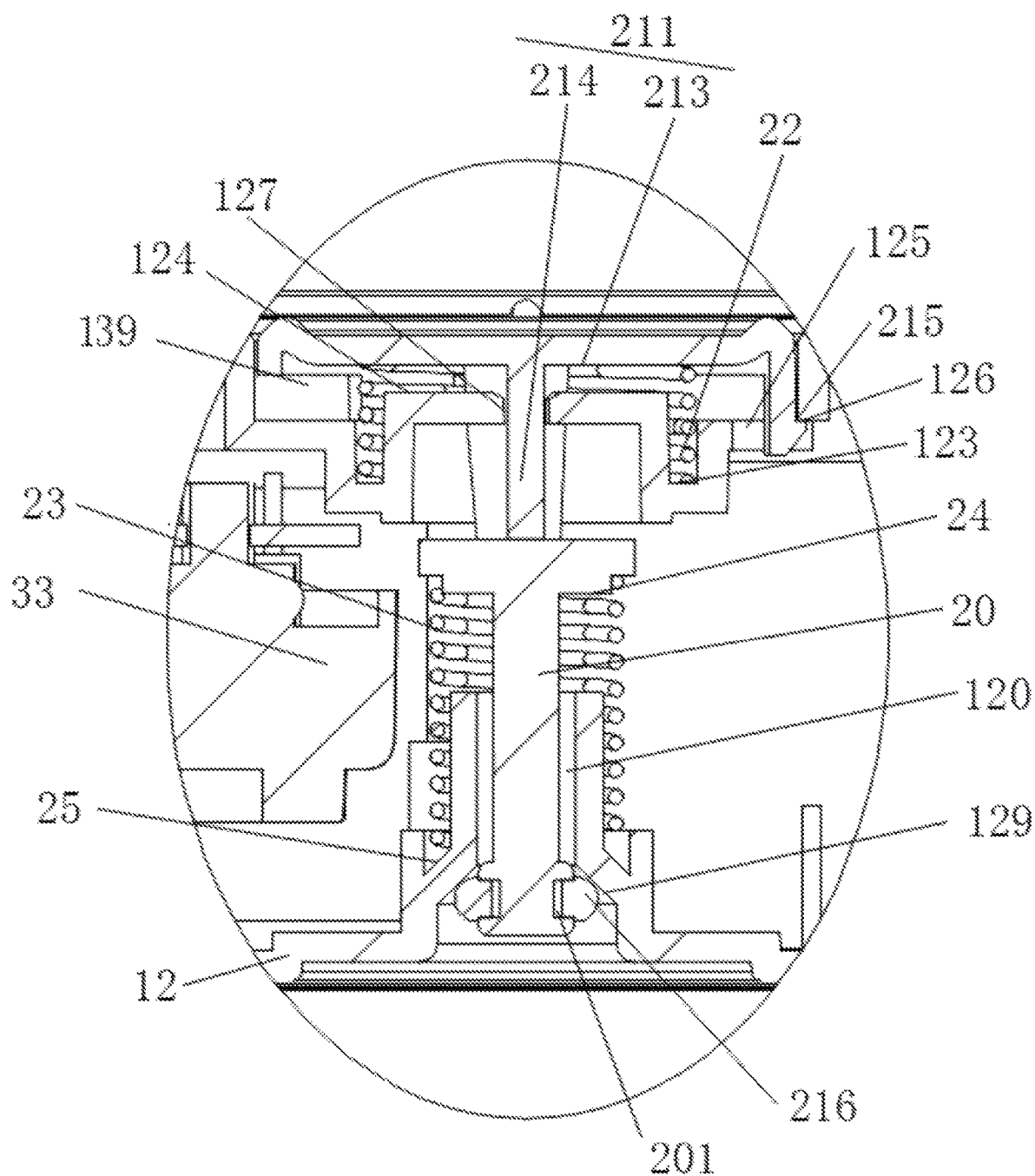
FIG. 4 is a partial enlarged view of A.
Figure 5:
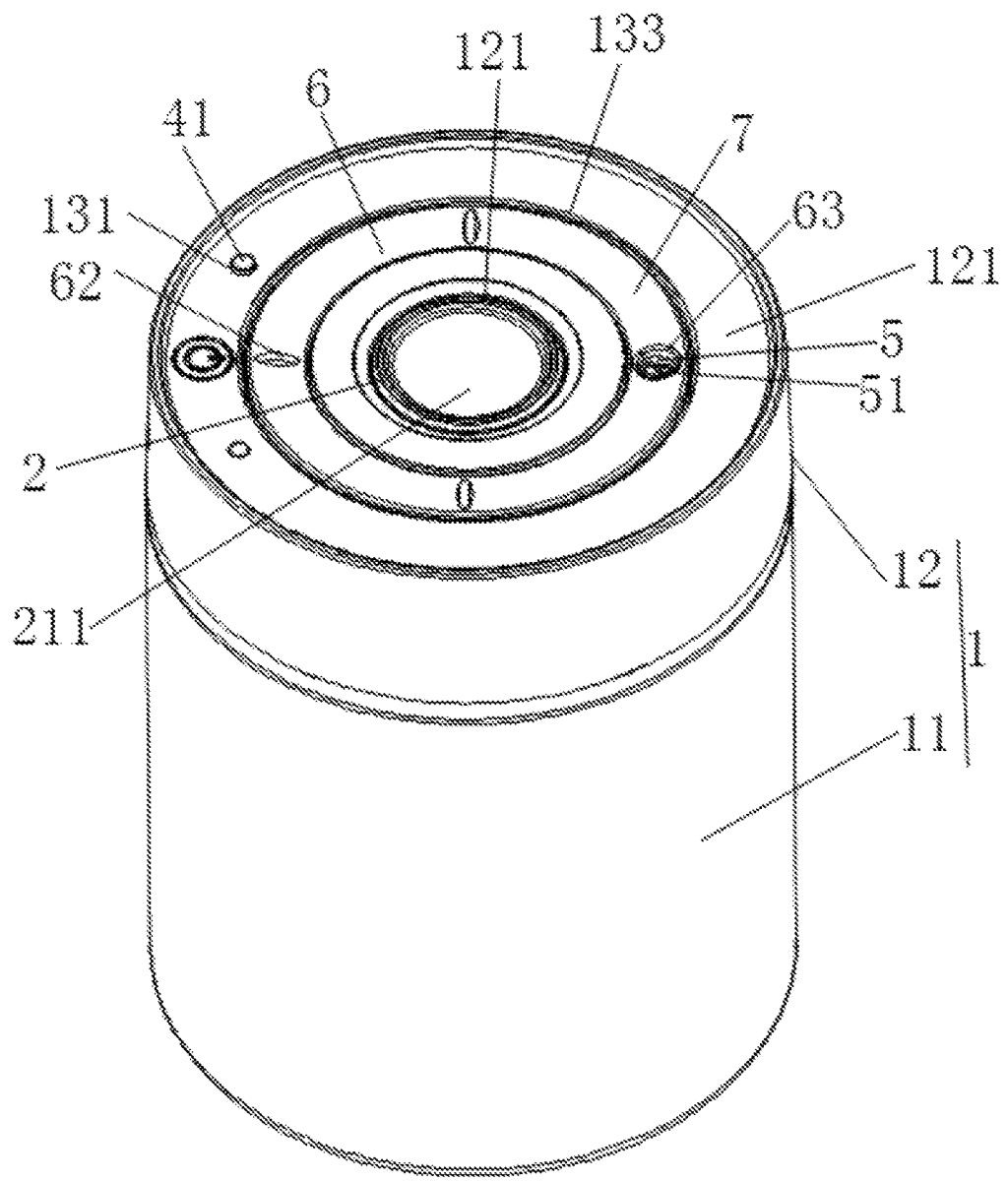
FIG. 5 is a schematic view (3) of an overall structure.
Figure 6:
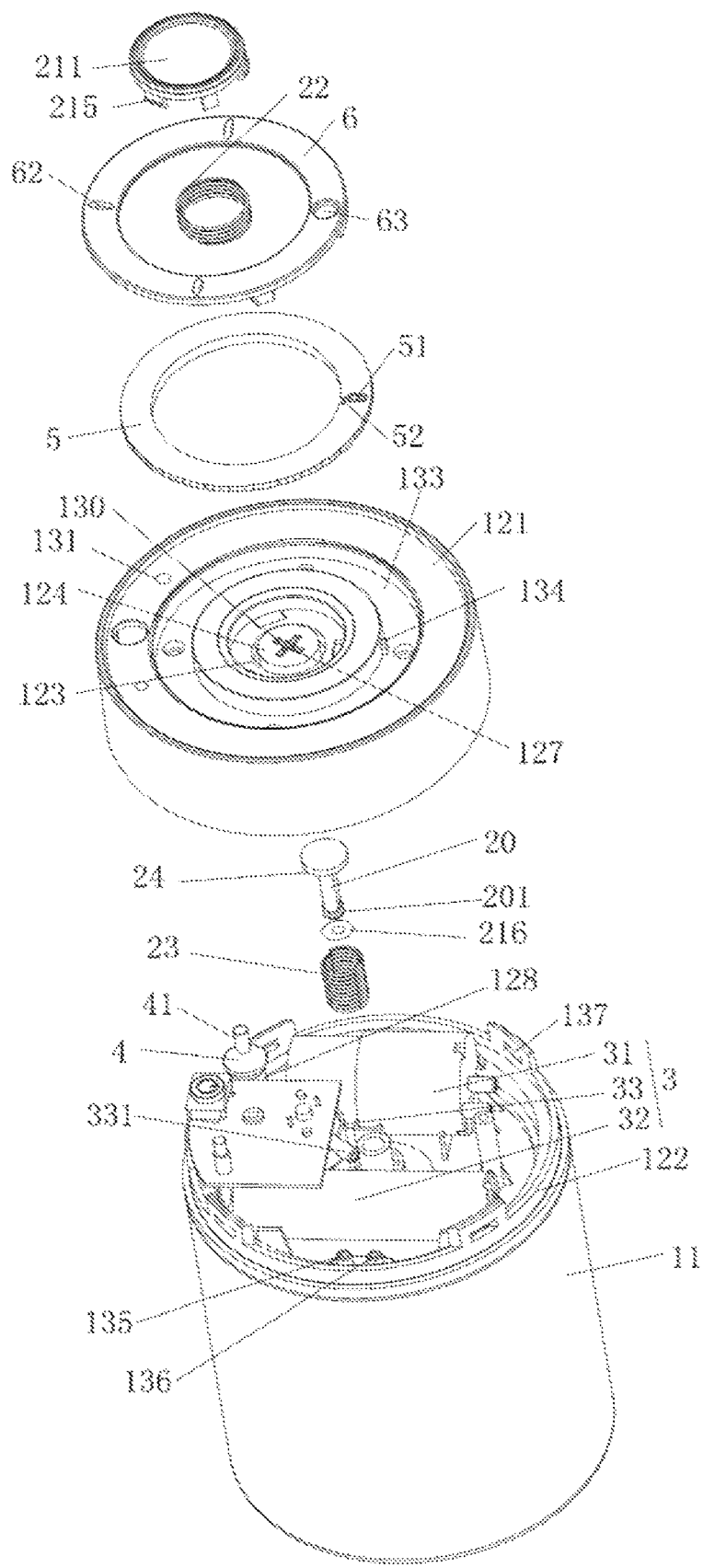
FIG. 6 is an exploded view.
Figure 7:
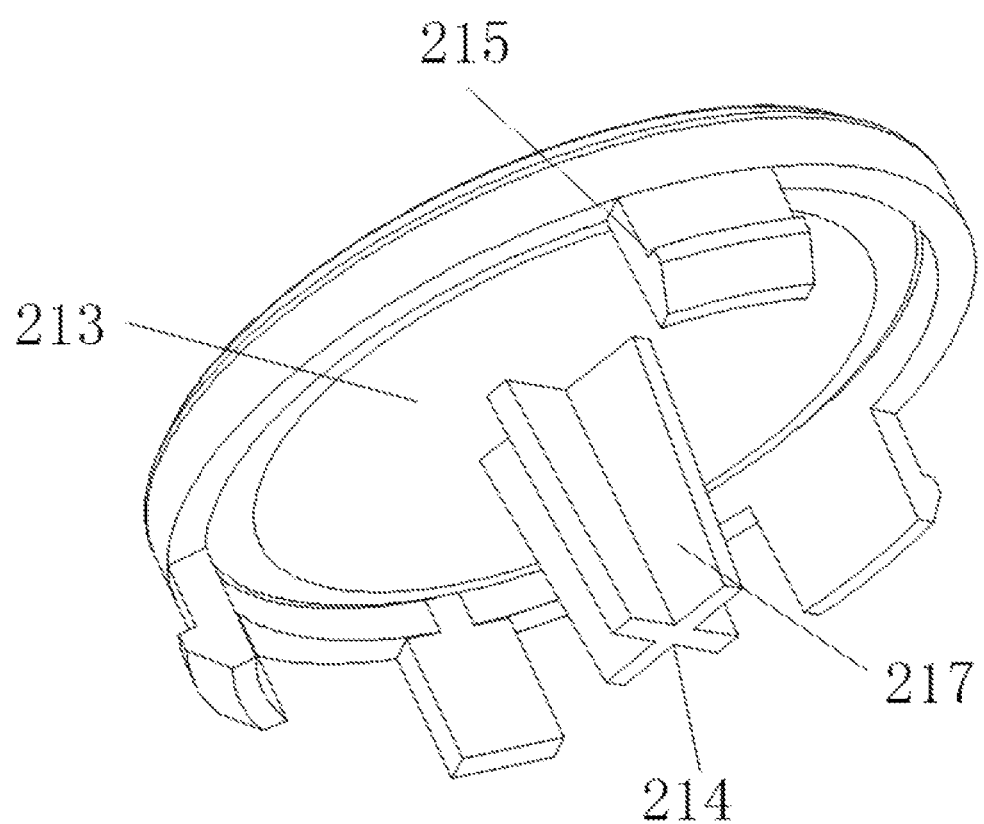
FIG. 7 is a schematic structural view of a manipulation part.

The technical solutions in the embodiments of the present disclosure will be clearly and completely described below with reference to the accompanying drawings in the embodiments of the present disclosure. Obviously, the described embodiments are only a part of the embodiments of the present disclosure, rather than all the embodiments. Based on the embodiments of the present disclosure, all other embodiments obtained by those of ordinary skill in the art fall within the protection scope of the present disclosure.

Embodiment 1

As shown in the drawings, a vacuum storage tank described in this embodiment includes a vacuum storage tank body 1. The vacuum storage tank body 1 is provided with a storage cavity 111 and a pressure release channel 120 in communication with the storage cavity 111, and the pressure release channel 120 is provided with a pressure release structure 2. The pressure release structure 2 includes a pressure release cylinder 21, and the pressure release cylinder 21 is placed in the pressure release channel 120. The pressure release cylinder 21 includes a manipulation part 211 and a sealing member 212 for blocking a port of the pressure release channel 120, and the manipulation part 211 extends from an outer wall of the vacuum storage tank body 1. A reset retaining structure is arranged between the pressure release cylinder 21 and the vacuum storage tank body 1 to control the pressure release cylinder 21 so that the sealing member 212 keeps blocking the port of the pressure release channel 120. Specifically, the vacuum storage tank body 1 includes a tank 11 and a cover 12 detachably connected to an opening of the tank 11, and the pressure release channel 120 is arranged on the cover 12, and the reset retaining structure is arranged between the pressure release cylinder 21 and the cover 12 to control the pressure release cylinder 21 so that the sealing member keeps blocking the port of the pressure release channel 120. At the same time, the cover 12 includes an upper shell 121 and a lower shell 122, the upper shell 121 and the lower shell 122 are joined together to form an accommodation cavity 13. The accommodation cavity 13 is provided with a vacuum generator 3, and the lower shell 122 is provided with a vacuumizing channel 135. The vacuum generator 3 is connected to the vacuumizing channel 135 through a pipeline, and the manipulation part 211 penetrates a perforation 127 of the upper shell 121. A filter body 7 is installed on the lower shell 122, and the filter body 7 covers the vacuumizing channel 135 and the pressure release channel 120. The filter body 7 includes a filtering non-woven fabric 71 and a stainless steel filter screen 72 located on a lower side of the filtering non-woven fabric 71, or includes only the filtering non-woven fabric 71 or the stainless steel filter screen 72, and a peripheral side of the filter body is embedded in an annular groove 132 on a bottom surface of the lower shell 122 for positioning and fixing.

In the above structure, an item that needs to be vacuum-stored is placed in the vacuum storage cavity 111 of the tank 11, then a lower portion of the lower shell is inserted into the opening of the tank, and a silicone sealing sleeve or rubber sealing sleeve 8 is arranged for sealing at a position where a lower outer wall of the lower shell is inserted into an inner wall of the opening of the tank 11, so as to prevent air from entering the vacuum storage cavity 111 of the tank 11 from the position where the lower outer wall of the lower shell 122 is inserted into the inner wall of the opening of the tank 11. At this time, the vacuum generator 3 is energized and started to vacuumized the vacuum storage cavity through the vacuumizing channel. After the vacuumization is completed, the item can be vacuum-stored. The tank is a stainless steel tank.

Actually, the vacuum generator 3 includes a vacuum pump 31, a lithium battery 32, a pressure sensing element 33, and a vacuum sensing channel 136 arranged on the lower shell 122. The lithium battery 32 supplies power to the vacuum pump 31. A vacuum pipeline is sleeved on a vacuumizing pipe of the vacuum pump 31, and the vacuum pipeline is sleeved on the vacuumizing channel 135. Two ends of a sensing pipeline are respectively sleeved on a pipe of the air pressure sensing element 33 and the vacuum sensing channel 136. Moreover, the upper shell 121 and the lower shell 122 are fastened to each other after being joined. The fastening is achieved by cooperation of a fastening groove 137 and a fastening block. At the same time, after the fastening is achieved, a bolt penetrates the upper shell, and the bolt is threadedly connected to a connecting column 13 of the lower shell to realize the further fixing of the upper shell 121 and the lower shell 122, so that the structure is more compact. Moreover, a side wall of the cover is provided with a charging interface.

Preferably, the upper shell of the cover 12 is provided with a ring groove 133, and the first ring body 5 is correspondingly placed in the ring groove 133. An inner wall of the ring groove 133 is provided with a locking block 134, an outer wall of the first ring body 5 is provided with a locking slot 52, and the locking block 134 is correspondingly snapped into the locking slot 52 for locking and fixing the first ring body 5. The first ring body 5 is covered by the second ring body 6, the first ring body 5 is provided with a plurality of numeric identifiers 51, and the second ring body 6 is provided with a through hole 63 corresponding to a position of at least one of the numeric identifiers 63. The second ring body 6 is provided with a locking hook 61, and the locking hook 61 is hooked to a side wall of the first ring body 5. The second ring body 6 is provided with a shift block 62 to facilitate rotation of the second ring body.

Preferably, the lower shell 122 is provided with a negative pressure observation channel 128, a flexible sleeve 4 is sleeved at a port of the negative pressure observation channel 128, the flexible sleeve 4 is provided with an observation column 41, and the observation column 41 penetrates the upper shell 121. During vacuumizing, an upper portion of the flexible sleeve 4 will shrink, so that the observation column moves downward, and it can be known that the vacuum storage cavity is in a vacuum state, which is convenient for a user to observe whether the storage tank is in a vacuum state and improves the use performance.

In this embodiment, the reset retaining structure includes at least one of a first spring 22 and a second spring 23. Two ends of the first spring 21 respectively abut against a first step 213 of the manipulation part 211 and a second step 123 of the upper shell 121; or two ends of the second spring 23 respectively abut against a third step 24 of the pressure release cylinder 21 and a fourth step 25 beside the pressure release channel 120. The pressure release cylinder is only a cylinder that can move vertically inside the pressure release channel, and therefore, the sealing member can be separated from the port of the pressure release channel by pressing or pulling up the pressure release cylinder using the manipulation part. The first spring or the second spring in a press-type pressure release structure adopts a spring that automatic stretches after compression. The first spring or the second spring in a pull-up pressure release structure adopts a spring that automatically resets and contracts after being stretched.

In this embodiment, the upper shell 121 is provided with an installation groove 139 at a position of the perforation 127, the first step 213 of the manipulation part 211 is placed in the installation groove 139, and the second step 123 is arranged in the installation groove 139. The structure arrangement realizes the positioning of the manipulation part.

Preferably, an inner wall of the installation groove 139 and the first step 213 of the manipulation part 211 are respectively provided with a sliding through groove 125 and a limiting buckle 215, the limiting buckle 215 correspondingly sinks into the sliding through groove 125, and an inner wall of the sliding through groove 125 is provided with a limiting step 126 for up-limiting upward movement of the manipulation part 211. The inner wall of the installation groove 139 is further provided with a fifth step 124. After the manipulation part 211 moves downward, the first step 213 and the fifth step 124 abut against each other for position-limiting. The structure realizes that the manipulation part, after being pressed, resets and moves upward to be still located in the installation groove 139, so that the overall vacuum storage tank has a beautiful appearance.

In this embodiment, an inner wall of the perforation 127 of the upper shell 121 is provided with a limiting through groove 130, an upper portion of the pressure release cylinder 21 is provided with a vertical protrusion 217 correspondingly matching the limiting through groove 130, and the vertical protrusion 217 is correspondingly inserted into the limiting through groove 130. The structure realizes the positioning of the pressure release cylinder.

In this embodiment, the sealing member 212 includes a seal ring 216 sleeved and fixed on the pressure release cylinder 21, a port of the pressure release channel 120 is provided with a tapered channel 129, the tapered channel 129 has an upper port smaller than a lower port, and an outer wall of the seal ring 216 abuts against an inner wall of the tapered channel 129 during blocking. The structure arrangement achieves a better effect of sealing a lower port of the pressure release channel by the seal ring. When the pull-up pressure release structure is adopted, the seal ring may be sleeved and connected to an annular recess 201 located on the pressure release cylinder and above the upper port of the pressure release channel. The structure of the tapered channel 129 is that an upper port is larger than a lower port. When the press-type pressure release structure is adopted, the seal ring is sleeved and connected to an annular recess 201 located on the pressure release cylinder and below the lower port of the pressure release channel.

Embodiment 2

The general structure of the vacuum storage tank described in this embodiment is the same as that of Embodiment 1, but the only difference is that the pressure release cylinder 21 further includes a cylinder part 20 located below the manipulation part 211, the cylinder part 20 and the manipulation part 211 are separated, an upper portion of the cylinder part 20 is provided with the third step 24 having a lower portion sleeved and fixed to the seal ring 216; a cylinder 214 of the manipulation part 211 penetrates the perforation 127 of the upper shell 121 and then abuts against an upper end of the cylinder part 20, and the vertical protrusion 217 is arranged. As mainly described, the manipulation part 211 and the cylinder part 20 are separated in the pressure release cylinder 21, and therefore, the seal ring 216 is sleeved and fixed on a lower portion of the cylinder part 20, and abuts against the second spring at least between the third step 24 of the cylinder part 20 and the fourth step 25 beside the pressure release channel 120. However, more preferably, the seal ring also abuts against the first spring between the first step 213 of the manipulation part 211 and the second step 123 of the upper shell 121, so that the manipulation part 211 can be quickly reset. At the same time, the separated structure of this embodiment is only suitable for a pressing operation.

The present disclosure is not limited to the above preferred embodiments. Anyone can obtain other products in various forms under the enlightenment of the present disclosure, but regardless of any changes in its shape or structure, any product having technical solutions the same as or similar to those of the present application shall fall within the protection scope of the present disclosure.

What is claimed is:

1. A vacuum storage tank, comprising a vacuum storage tank body (1), the vacuum storage tank body (1) being provided with a storage cavity (111) and a pressure release channel (120) in communication with the storage cavity (111), and the pressure release channel (120) being provided with a pressure release structure (2), wherein the pressure release structure (2) comprises a pressure release cylinder (21), the pressure release cylinder (21) is placed in the pressure release channel (120), the pressure release cylinder (21) comprises a manipulation part (211) and a sealing member (212) for blocking a port of the pressure release channel (120), and the manipulation part (211) extends from an outer wall of the vacuum storage tank body (1);

the vacuum storage tank body (1) comprises a tank (11) and a cover (12) detachably connected to an opening of the tank (11), the pressure release channel (120) is arranged on the cover (12), and a reset retaining structure is arranged between the pressure release cylinder (21) and the cover (12) to control the pressure release cylinder (21) so that the sealing member (212) keeps blocking the port of the pressure release channel (120); and the cover (12) comprises an upper shell (121) and a lower shell (122), the upper shell (121) and the lower shell (122) are joined together to form an accommodation cavity (13), the accommodation cavity (13) is provided with a vacuum generator (3), the lower shell (122) is provided with a vacuumizing channel (135), the vacuum generator (3) is connected to the vacuumizing channel (135) through a pipeline, and the manipulation part (211) penetrates a perforation (127) of the upper shell (121).

2. The vacuum storage tank according to claim 1, wherein a first ring body (5) and a second ring body (6) covering the first ring body (5) are installed on the cover (12), the first ring body (5) is provided with a plurality of numeric identifiers (63), and the second ring body (6) is provided with a through hole (62) corresponding to a position of at least one of the numeric identifiers (63).

3. The vacuum storage tank according to claim 2, wherein a filter body (7) is installed on the lower shell (122), and the filter body (7) covers the vacuumizing channel (135) and the pressure release channel (120).

4. The vacuum storage tank according to claim 3, wherein the lower shell (122) is provided with a negative pressure observation channel (128), a flexible sleeve (4) is sleeved at a port of the negative pressure observation channel (128), the flexible sleeve (4) is provided with an observation column (41), and the observation column (41) penetrates the upper shell (121).

5. The vacuum storage tank according to claim 3, wherein the reset retaining structure comprises at least one of a first spring (22) and a second spring (23);
- two ends of the first spring (22) respectively abut against a first step (213) of the manipulation part (211) and a second step (123) of the upper shell (121);
- or two ends of the second spring (23) respectively abut against a third step (24) of the pressure release cylinder (21) and a fourth step (25) beside the pressure release channel (120).

6. The vacuum storage tank according to claim 5, wherein the upper shell (121) is provided with an installation groove (139) at a position of the perforation (127), the first step (213) of the manipulation part (211) is placed in the installation groove (139), and the second step (123) is arranged in the installation groove (139).

7. The vacuum storage tank according to claim 6, wherein an inner wall of the installation groove (139) and the first step (213) of the manipulation part (211) are respectively provided with a sliding through groove (125) and a limiting buckle (215), the limiting buckle (215) correspondingly sinks into the sliding through groove (125), and an inner wall of the sliding through groove (125) is provided with a limiting step (126) for up-limiting upward movement of the manipulation part (211).

8. The vacuum storage tank according to claim 7, wherein the inner wall of the installation groove (139) is further provided with a fifth step (124), and after the manipulation part (211) moves downward, the first step (213) and the fifth step (124) abut against each other for position-limiting.

9. The vacuum storage tank according to claim 2, wherein an inner wall of the perforation (127) of the upper shell (121) is provided with a limiting through groove (130), an upper portion of the pressure release cylinder (21) is provided with a vertical protrusion (217) correspondingly matching the limiting through groove (130), and the vertical protrusion (217) is correspondingly inserted into the limiting through groove (130).

10. The vacuum storage tank according to claim 9, wherein the sealing member (212) comprises a seal ring (216) sleeved and fixed on the pressure release cylinder, a port of the pressure release channel (120) is provided with a tapered channel (129), the tapered channel (129) has an upper port smaller than a lower port, and an outer wall of the seal ring (216) abuts against an inner wall of the tapered channel (129) during blocking.

11. The vacuum storage tank according to claim 10, wherein the pressure release cylinder (21) further comprises a cylinder part (20) located below the manipulation part (211), the cylinder part (20) and the manipulation part (211) are separated, an upper portion of the cylinder part (20) is provided with the third step (24) having a lower portion sleeved and fixed to the seal ring (216); a cylinder (214) of the manipulation part (211) penetrates the perforation (127) of the upper shell (121) and then abuts against an upper end of the cylinder part (20), and the vertical protrusion (217) is arranged; the seal ring (216) is sleeved and fixed on a lower portion of the cylinder part (20), and abuts against the second spring (23) at least between the third step (24) of the cylinder part (20) and the fourth step (25) beside the pressure release channel (120).

\* \* \* \* \*